US005657974A

United States Patent [19]
Williams

[11] Patent Number: 5,657,974
[45] Date of Patent: Aug. 19, 1997

[54] WORKPIECE CLAMPING APPARATUS FOR A COLLAPSIBLE WORK BENCH

[76] Inventor: Willis Ray Williams, 767 S. Fielder, Arlington, Tex. 76013

[21] Appl. No.: 514,175

[22] Filed: Aug. 11, 1995

Related U.S. Application Data

[63] Continuation-in-part of Ser. No. 245,286, May 16, 1994, Pat. No. 5,584,254.

[51] Int. Cl.$^6$ ........ B32Q 3/02

[52] U.S. Cl. ........ 269/93; 269/94; 269/231; 269/208; 269/900; 269/99

[58] Field of Search ........ 269/231, 235, 269/236, 229, 91, 93, 94, 208, 209, 900, 99

[56] References Cited

U.S. PATENT DOCUMENTS

| | | | |
|---|---|---|---|
| 372,274 | 10/1887 | Oliver | 269/231 |
| 1,259,760 | 3/1918 | Kaiser | 269/231 |
| 1,291,519 | 1/1919 | Hodges | 269/231 |
| 4,140,305 | 2/1979 | Rabin | 269/900 |
| 4,157,819 | 6/1979 | Meyer | 269/231 |
| 4,650,106 | 3/1987 | Branaman | 269/900 |

FOREIGN PATENT DOCUMENTS

| | | | |
|---|---|---|---|
| 61363 | 9/1943 | Denmark | 29/231 |

*Primary Examiner*—Robert C. Watson
*Attorney, Agent, or Firm*—Henderson & Sturm

[57] ABSTRACT

A workpiece clamping apparatus has a first cam with an arcuate exterior surface thereon. A pin is provided for rotationally mounting the cam about an axis to an anchoring member. An adjusting mechanism is provided for adjusting the position of the pin means with respect to the anchoring member.

A second cam is operably attached to the pin and is mounted for rotation about the axis.

An anchoring member is attached to the work surface.

A track member is attached to the work surface and the bottom of the anchoring member is attached to the track member.

9 Claims, 6 Drawing Sheets

WORKPIECE CLAMPING APPARATUS FOR A COLLAPSIBLE WORK BENCH

This application is a continuation in part of patent application Ser. No. 08/245,286, filed May 16, 1994 now U.S. Pat. No. 5,584,254 and entitled "Collapsible Work Bench Apparatus", the subject matter of which is incorporated herein by reference.

TECHNICAL FIELD

This present invention relates to the field of foldable work support surfaces in general, and in particular, to a collapsible work bench having self-supporting work surfaces which cooperate with one another when the work bench is deployed in its operative disposition and a workpiece clamping apparatus for use in conjunction therewith.

BACKGROUND ART

As can be seen by reference to the following U.S. Pat. Nos. 5,052,308; 2,618,525; 2,587,010; and 559,743; the prior art is replete with myriad and diverse collapsible table and work bench constructions.

While all of the aforementioned prior art constructions are more than adequate for the basic purpose and function for which they have been specifically designed, these patented arrangements are still uniformly deficient with regard to their adaptability for use with a variety of conventional workshop hand tools and bench top power tools and accessories that may operatively deployed thereon.

In addition, most work bench apparatus employ complicated workpiece clamping arrangements that only engage the workpiece in a lateral fashion; however, there are many instances wherein a vertical clamping capability is preferable, and the prior art arrangements are sorely remiss in this regard.

As both professional craftsman and weekend handymen are all to well aware, most of their tasks and chores require a sturdy, strong and dependable work surface which is both compact and portable to facilitate transport between work sites and for the purposes of storage as well as having a work piece clamping apparatus that will securely position a workpiece relative to the work surface.

As a consequence of the foregoing situation, there has existed a longstanding need for a new type of work bench clamping apparatus for a collapsible work bench that will fulfill all of the needs of both the professional and amateur craftsman alike, and the provision of such a construction is a stated objective of the present invention.

DISCLOSURE OF THE INVENTION

Briefly stated, the workpiece clamping apparatus for a collapsible work bench that forms the basis of the present invention is employed in conjunction with a work bench apparatus that comprises in general two pairs of support legs pivotally joined together; wherein, each pair of support legs is provided with a pair of support struts which are pivotally joined to one of the pairs of support legs and connected to one another by a portion of the work bench work surface whereas the entire apparatus is portable.

Each portion of the work bench work surface is further provided with a central apertured panel which is flanked on both ends by at least one track member which cooperates with the workpiece clamping apparatus of this invention.

The workpiece clamping apparatus comprises in general an anchoring member having a lower base portion which is slideably received in the track members formed on the planar work support surface of the work bench.

In addition, the upper portion of the anchoring member is dimensioned to adjustably receive a pin member axially connected to at least one locking cam having an arcuate exterior surface that may be brought into frictional engagement with the top surface of a workpiece to clamp the workpiece to the planar work support surface of the work bench.

As will also be explained in greater detail further on in the specification, the collapsible work bench apparatus of this invention further includes at least one locking clip element for joining the track portions of the work bench surface together in their operative mode of disposition as well as in a side to side orientation with another work bench apparatus, and at least one locking bar for joining the track portions of two identical work bench apparatus together in a end-to-end orientation.

BRIEF DESCRIPTION OF THE DRAWINGS

These and other attributes of the invention will become more clear upon a thorough study of the following description of the best mode for carrying out the invention, particularly when reviewed in conjunction with the drawing wherein.

BEST MODE FOR CARRYING OUT THE INVENTION

Figure 1:
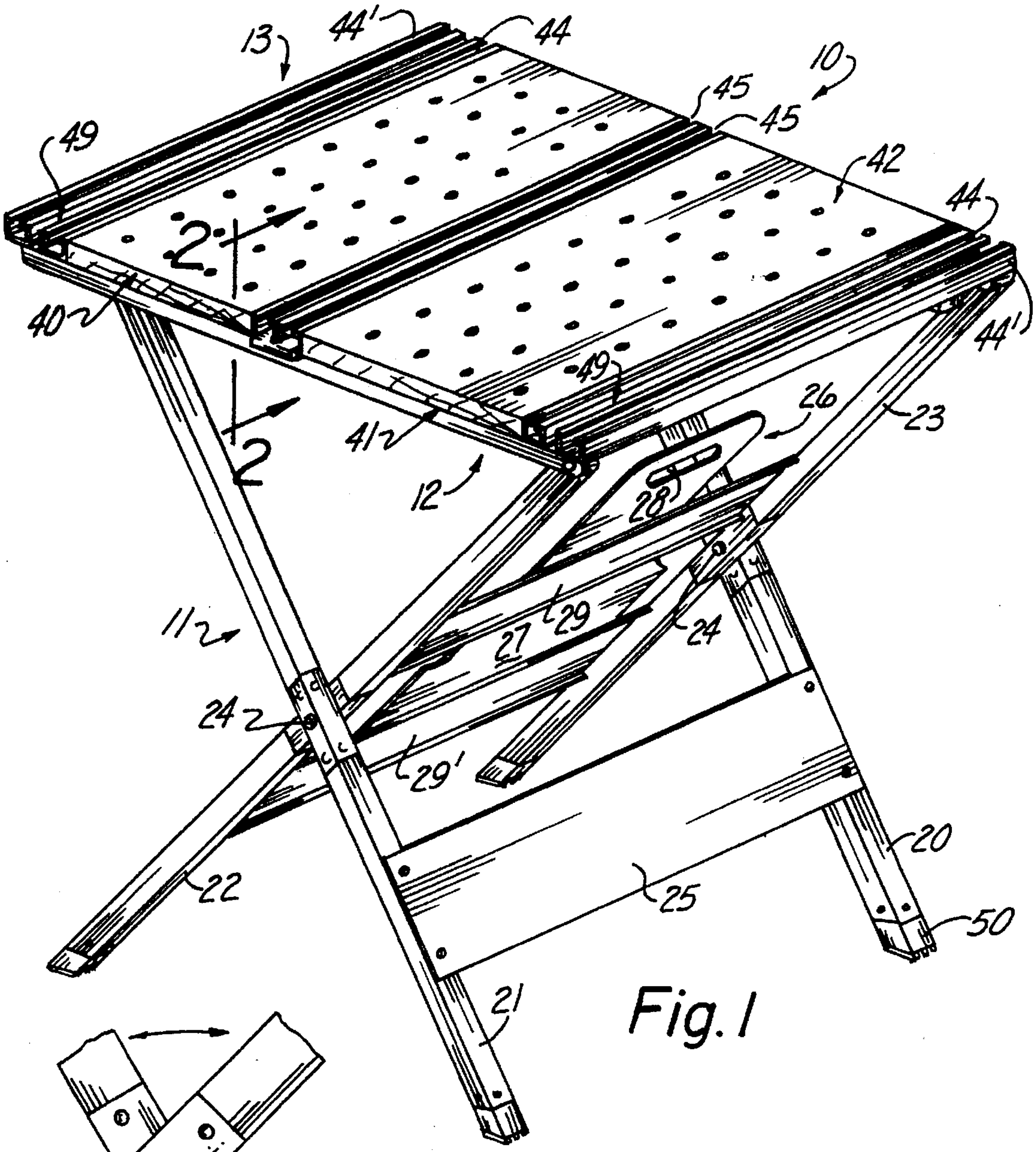
FIG. 1 is a perspective view of the work bench that forms the basis of the present invention deployed in its operative more of disposition.

As can be seen by reference to the drawings, and in particular to FIG. 1, the collapsible work bench that forms the basis of the present invention is designated generally by the reference numeral (10).

The work bench (10) comprises in general a support leg assembly (11) a strut assembly (12) and a work support assembly (13). These assemblies will now be described in seriatim fashion.

Figure 3:
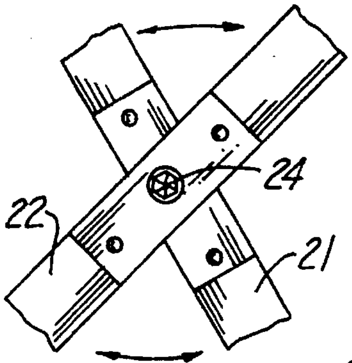
FIG. 3 is an isolated side view of the pivotal engagement between the support legs.

As shown in FIGS. 1 and 3, the support leg assembly (11) comprises two pairs of support legs (20) (21) and (22) (23); wherein, the first outer pair of support legs (20) (21) is pivotally connected to the second inner pair of support legs (22) (23) proximate their respective midpoints by pivot bolts (24) in a well-recognized manner, and wherein, the first pair of support legs (20)(21) at a location below the pivot bolts, and the second pair of support legs (22)(23) is provided with an enlarged contoured brace element (26) which will be described presently.

In addition, as can also be seen by reference to FIG. 1, a collapsible brace element (80) may be provided between the outer pair (20)(21) of support legs and the inner pair (22)(23) of support legs to provide greater rigidity and strength to the support leg assembly.

Figure 7:
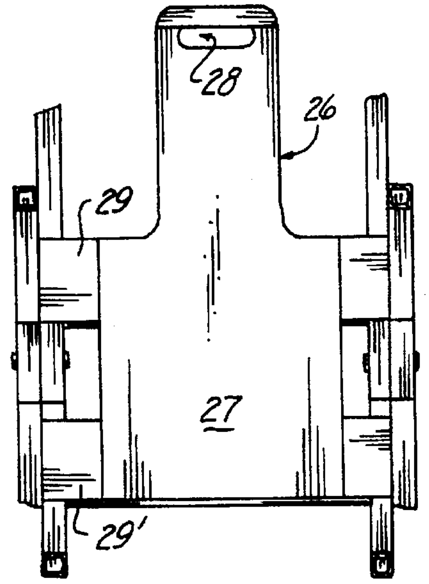
FIG. 7 is a detailed view of the combined handle and brace element of the apparatus.
Figure 9:
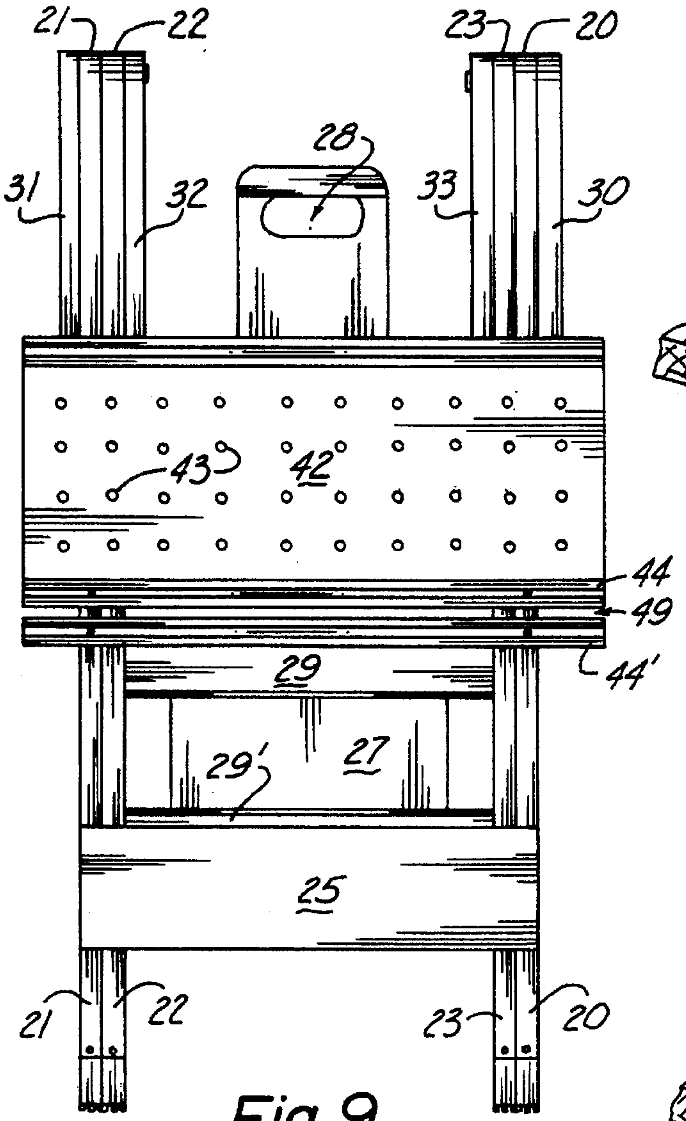
FIG. 9 is a side elevation view of the work bench apparatus.

As can best be seen by reference to FIGS. 1, 7 and 9, the contoured brace element (26) comprises an elongated central body portion (27) having an handle aperture (28) formed therein and a pair of brace arms (29) (29') which are rigidly secured to the contoured brace element and connected to the support legs (22)(23) at locations both above and below the position of the pivot bolts (24).

Figure 13:
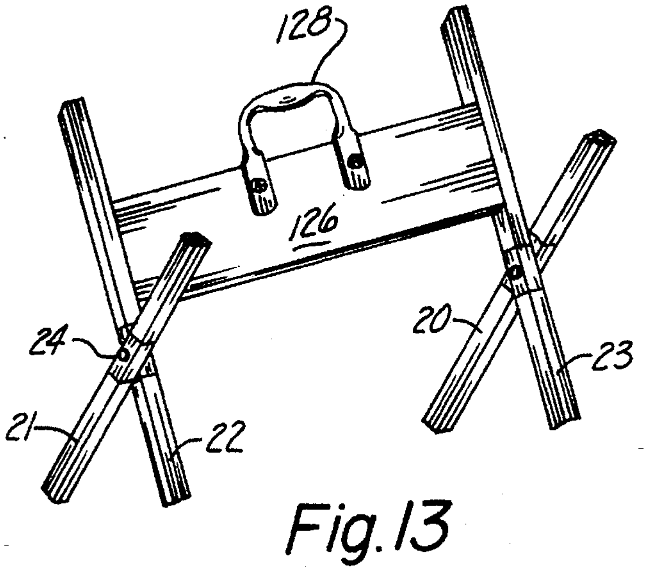
FIG. 13 is an isolated detail view of an alternate handle and brace arrangement.

In an alternate version of the preferred embodiment of the work bench depicted in FIG. 13, the contoured brace element (26) is replaced by a single elongated rectangular brace member (126) which is securely affixed intermediate the second pair of support legs (22)(23) at a point disposed proximate to, but above the location of the pivot bolts (24). In addition, the brace member (126) is further provided with a rigid handle element (128).

Turning now to FIGS. 1, 4, 5 and 6, it can be seen that the bottom of each one of the support legs is provided with a foot member (50), including an angled rubberized bearing pad (51) having two distinct ribbed bearing surfaces (52) and (53); wherein, one bearing surface (52) is in contact with the floor when the apparatus is deployed in its operative disposition and the other bearing surface (53) is in contact with the floor when the apparatus is deployed in its stored disposition.

As shown in FIGS. 5, 6, 8 and 9, the strut assembly (12) comprises a first pair of elongated outer strut arms (30)(31) pivotally secured on one end to the upper ends respectively of the first outer pair of support legs (20) and (21), and a second pair of elongated inner strut arms (32)(33) pivotally secured on one end to the upper ends respectively of the second inner pair of support legs (22) (23) in a well-recognized manner.

Still referring to FIGS. 5, 6, 8 and 9, it can be seen that the work support assembly (13) comprises two mirror image table top portions (40)(41), wherein, each table top portion (40) comprises an enlarged generally rectangular rigid support surface (42) provided with a plurality of spaced apertures (43) arranged in parallel rows, and wherein each support surface (42) is secured to the outboard or free ends respectively of the two pairs of strut arms (30)(31) and (32)(33).

Figure 11:
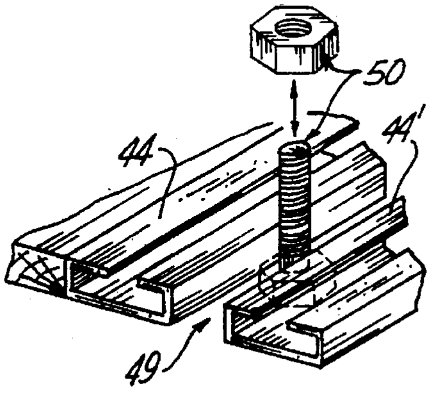
FIG. 11 is an isolated detail view of the means by which power tools may be mounted on the apparatus.
Figure 10:
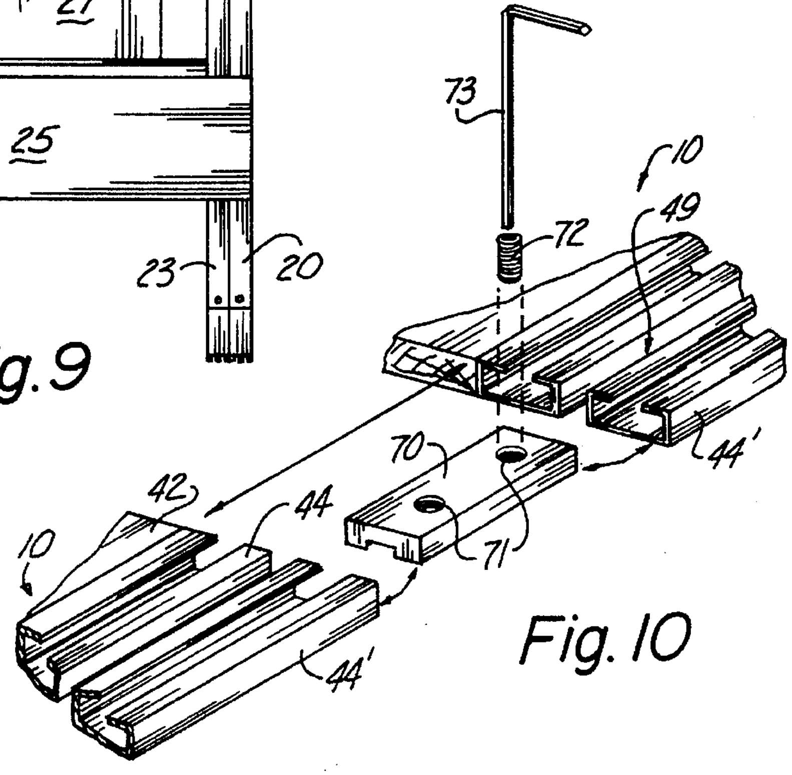
FIG. 10 is an isolated perspective view of the end-to-end engagement of two identical work bench apparatus.

In addition, as shown in FIGS. 1, 10 and 11, each support surface (42) is provided with a track system comprised of a pair of track channels (44) (44') separated by a gap (49) and disposed on the outboard side of the support surface (42) and a single track channel (45) disposed on the inboard end of the support surface (42). In this manner, when the apparatus (10) is deployed in its operative mode as depicted in FIG. 1, the work surface assembly (13) will have a pair of spaced track channels (44) (44') formed on both sides, and two single track channels (45)(45) disposed in an abutting relationship along its midpoint.

It should also be noted at this juncture, that the track system and the apertured support surfaces are dimensioned and designed to receive diverse accessories and clamping systems for the purpose of securing work pieces to the support surfaces and/or mounting hand tools and power tools thereon as will be explained in greater detail further on in the specification.

Figure 8:
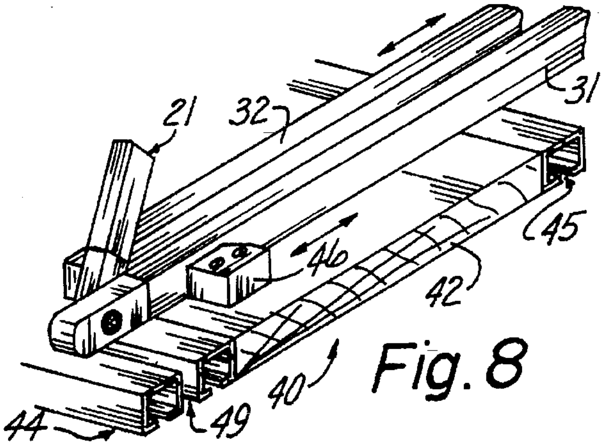
FIG. 8 is an isolated perspective view of the cooperation of the sheer block and the strut member.

As can best be seen by reference to FIG. 8, the bottom portion of each of the support surfaces (42) are provided with shear blocks (46) which engage the strut arms to align the support surfaces (42) and prevent them from a transverse shear condition during operations.

Figure 2:
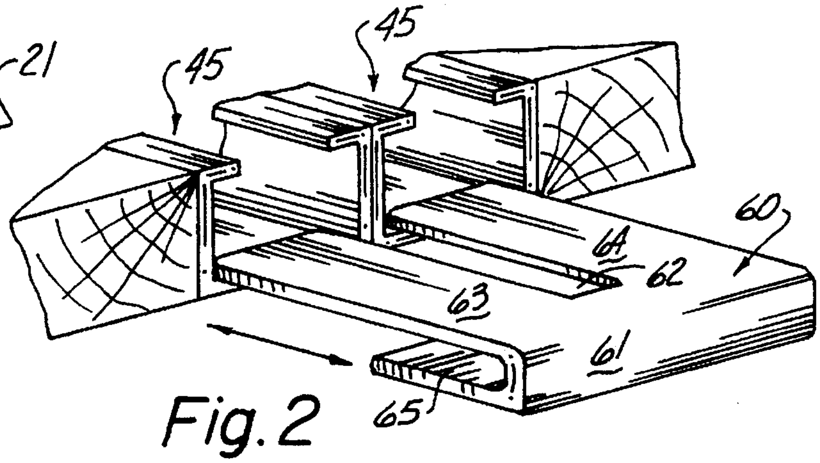
FIG. 2 is an isolated perspective view of the engagement of the locking clip with the work bench work surface.
Figure 5:
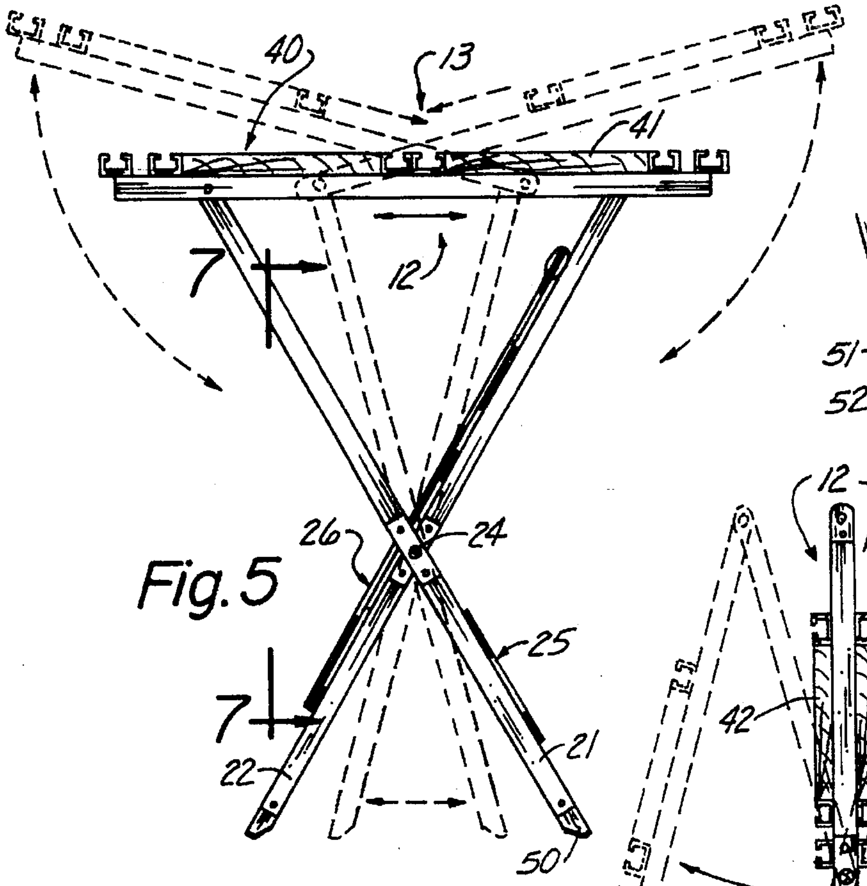
FIG. 5 is a side elevation view of the movements employed to deploy the apparatus in its operative disposition.
Figure 4:
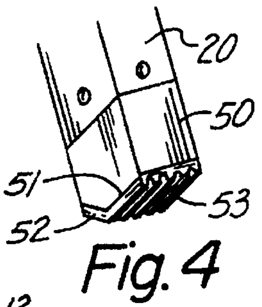
FIG. 4 is an isolated perspective view of the foot construction for each support leg.
Figure 6:
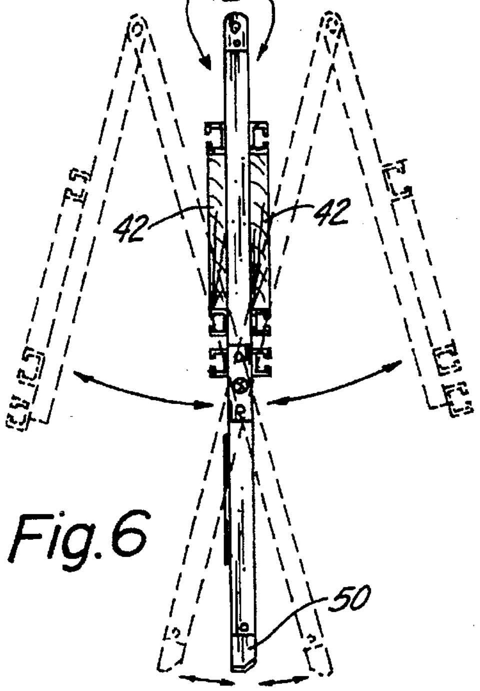
FIG. 6 is a side elevation view of the movements employed to deploy the apparatus in its collapsed disposition.

In addition as shown in FIG. 2, the apparatus (10) is also provided with a locking clip designated generally as (60) for securing the two support surfaces (42) in their operative mode of disposition, wherein the locking clip (60) captively engages the center track channels (45) and maintains them in their abutting relationship.

The locking clip (60) comprises a generally J-shaped clip member (61) having an elongated slot (62) which forms two arms (63)(64) dimensioned to be received within the openings of the abutting channels (45), wherein the slot (62) is dimensioned to receive the abutting walls of the channels (45) and the foot (65) of the clip member (61) extends across the bottom of the abutting track channels (45).

It should further be noted that while the locking clip (60) depicted in FIG. 2 is used to join the support surfaces (42) of a single apparatus (10) together, the locking clip (60) may also be employed to join two identical work benches (10) together in a side-by-side fashion by inserting the locking clip (60) into the outboard tracks of two abutting outboard track channels (44) on the respective apparatus (10).

Turning now to FIG. 10, it can be seen that the work bench (10) is further provided with a locking bar (70) which has an elongated rectangular configuration and which is dimensioned to be received in a selected one of the track channels (44) joining identical work benches (10) together in a end-to-end fashion.

As shown in FIG. 10, the locking bar (70) is provided with threaded bores (71) disposed proximate to, but spaced from the ends of the locking bar (70), wherein the bores (71) are dimensioned to receive locking nuts (72) for securing the opposite ends of the locking bar (70) into the abutting ends of two apparatus (10) placed into a end-to-end relationship by use of a special tool (73).

Turning now to FIG. 11 it can be seen that the gap (49) between the spaced track channels (44), (44') is dimensioned to receive securing means (50) for operatively and releasably attaching diverse tools (not shown) to the top of the work bench apparatus (10).

Figure 12:
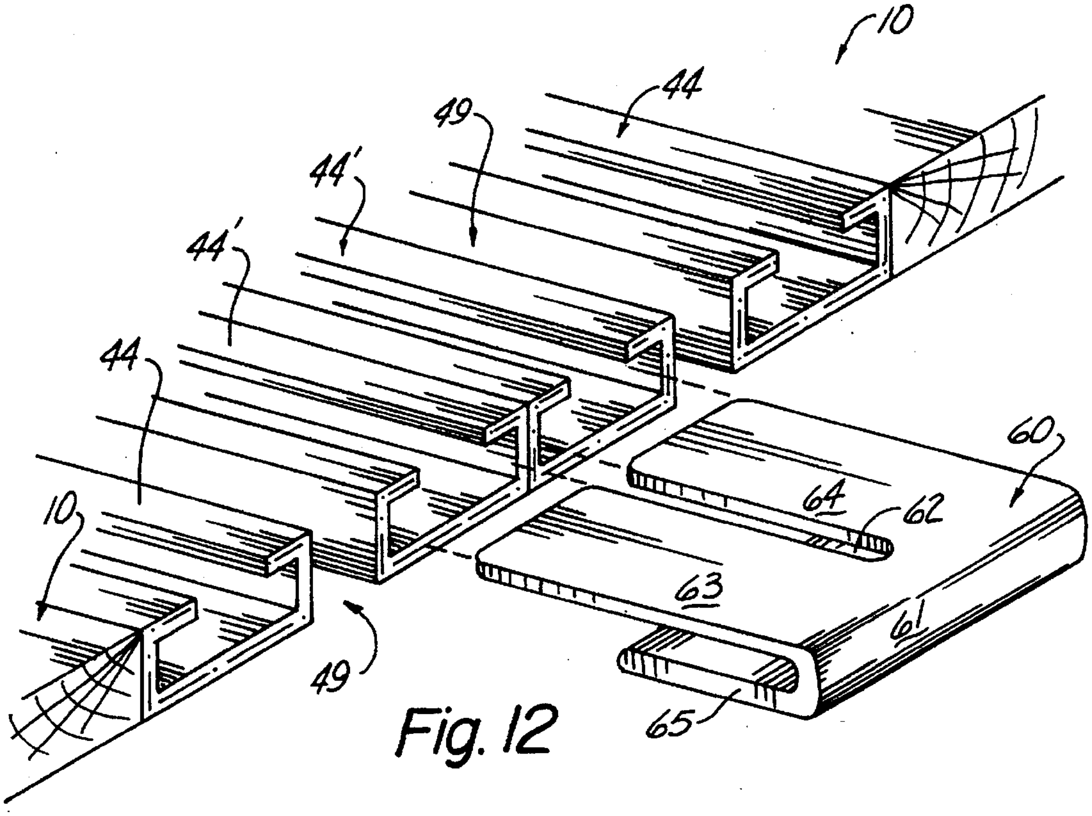
FIG. 12 is an isolated perspective view of the side to side engagement of two identical work bench apparatus.

In addition as can be seen by reference to FIG. 12, the locking clip (60) may be employed to join two identical work benches (10) together in a side by side engagement; wherein, the locking clip (60) captively engages the outboard track channels (44') on each work bench apparatus (10).

It should also be noted that this invention also encompasses an adjustable height feature which involves the selective removal of one or both of the centrally disposed abutting track channels (45); wherein the height adjustment of the apparatus is related to the width of the track channels (45) that are removed.

In the embodiment of the invention that is depicted in the drawings, the removal of each track lowers the height of the apparatus by 1¼ inches so that the total height adjustment can be as much as 2½ inches.

Figure 16:
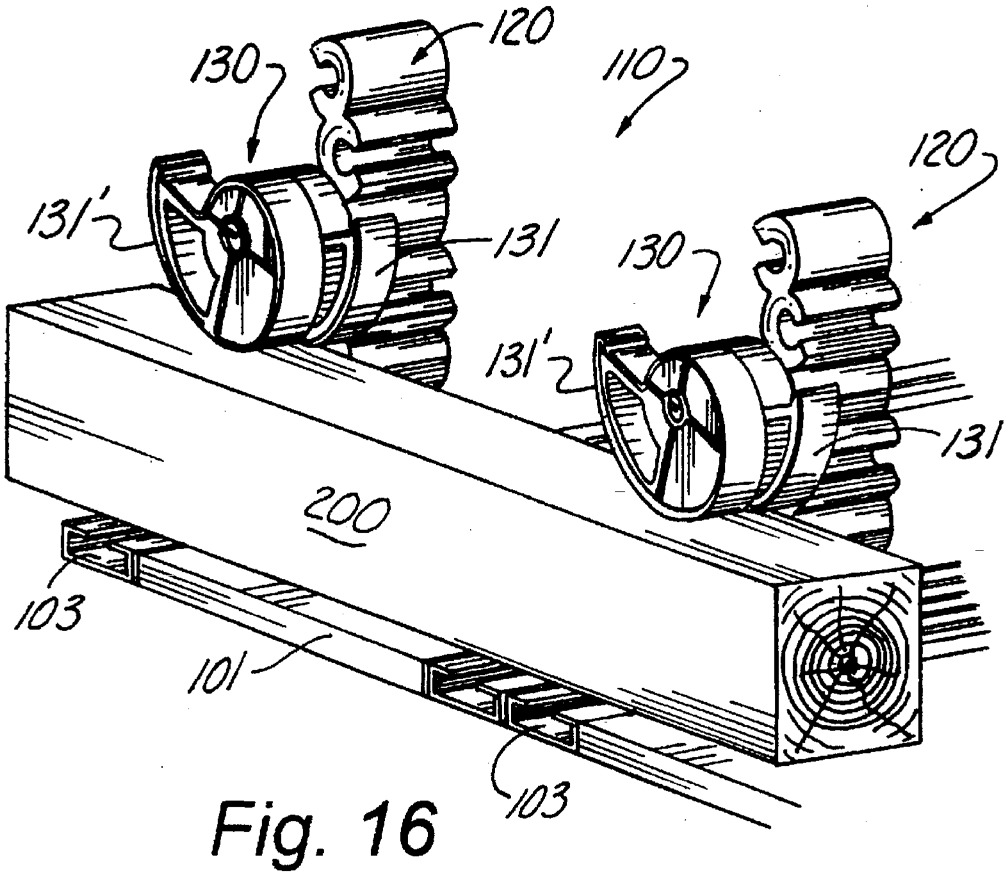
FIG. 16 is a perspective view of the workpiece clamping apparatus that forms the basis of the present invention.

Turning now to FIG. 16 it can be seen that the workpiece clamping apparatus of this invention is designated generally by the reference numeral (110). With regard to this particular portion of the invention a new numbering system will be employed. Prior to embarking upon a detailed description of the workpiece clamping apparatus (110) it would first be advisable to describe the environment in which this apparatus (110) is employed.

Figure 14:
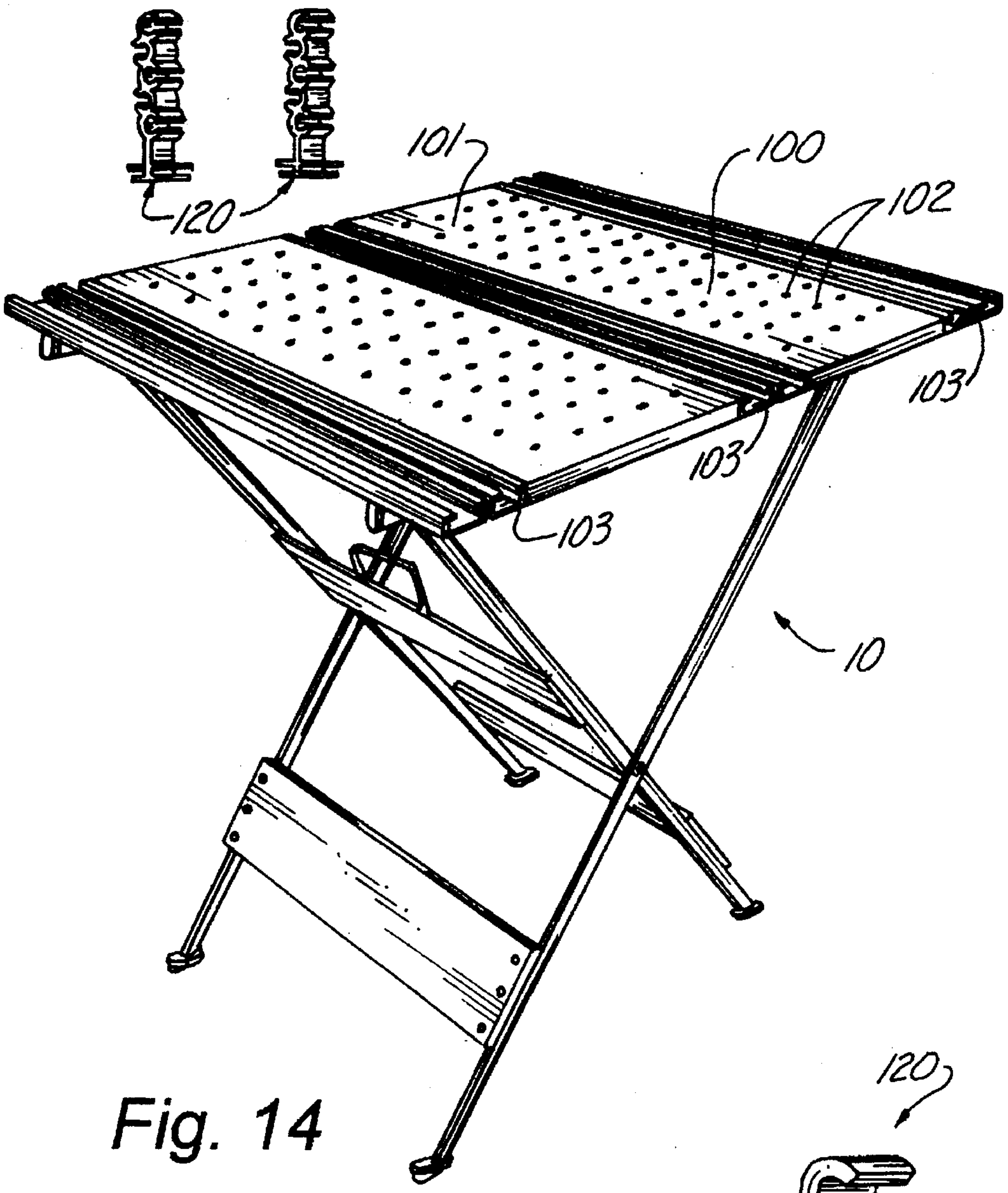
FIG. 14 is an exploded perspective view of a pair of anchoring members disposed above the channel equipped portions of the planar work support surface of the work bench.

As can best be seen by reference to FIGS. 14 and 16, the work bench (10) is provided with a planar work support surface (100) having generally rigid support surfaces (101) provided with a plurality of spaced apertures (102) arranged in rows, and, a plurality of channel track members (103) associated with said rigid support surfaces (101).

As can also be seen by reference to FIGS. 14 and 16 the workpiece clamping apparatus (110) comprises a pair of anchoring members (120) each provided with at least one locking cam member (130); wherein, that anchoring members (120) are adapted to be operatively engaged with the channel track member (103) of the planar work support surface (100), and, the locking cam members (130) are adapted to frictionally engage a workpiece (200) to the planar work support surface (100).

Figure 15:
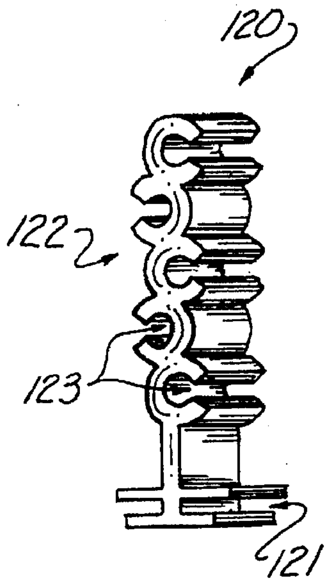
FIG. 15 is an isolated perspective view of one of the anchoring members.

Turning now to FIG. 15, it can be seen that the anchoring member (120) is provided with a lower base portion (121) which is dimensioned to be slideably received in the channel track members (103). In addition, the anchoring member (120) is further provided with an upper portion (122) provided with a plurality of vertically staggered apertures (123) which are dimensioned to adjustably receive the locking cam member (130) as will be explained presently.

Figure 17:
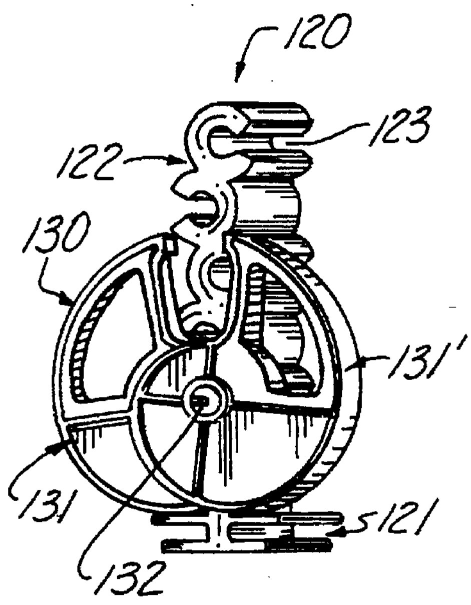
FIG. 17 is an isolated perspective view of the anchor member and a double locking cam arrangement; and, FIG. 18 is an isolated perspective view of the anchor member and a single locking cam arrangement.
Figure 18:
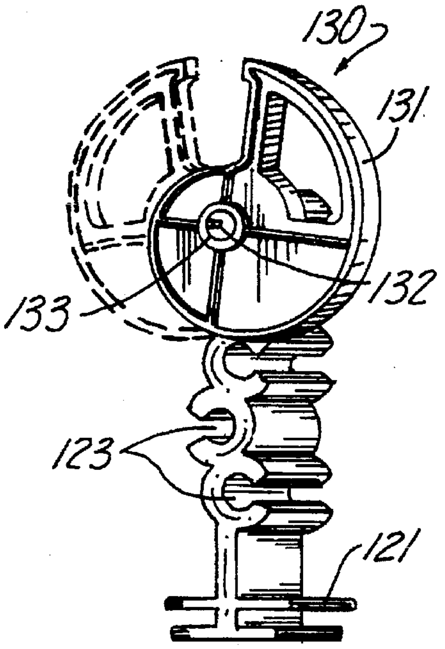

As shown in FIGS. 17 and 18, the locking cam member (130) includes an arcuate camming surface (131); wherein, the cam member (130) is rotatably mounted on an axial pin member (132) which extends through an aperture (133) formed in the cam member (130) and is dimensioned to be received in the apertures (123) of the anchoring member (120).

Still referring to FIGS. 17 and 18, it can be seen that in one version of the preferred embodiment the cam member (130) employs a single arcuate camming surface (131) and in another version of the preferred embodiment the camming member (130) employs a pair of independently operable arcuate camming surfaces (131) and (131').

In addition, the height of the camming member (130) relative to the workpiece (200) and the planar support (100) may be varied by selectively choosing the vertically arrayed apertures (123) in the anchoring member (120) that receives the axial pin member (132) of the locking cam member (130).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A workpiece clamping apparatus comprising:

a first cam having an arcuate exterior surface thereon;

an anchoring member;

pin means for rotationally mounting said cam about a horizontal axis relative to said anchoring member;

means for vertically adjusting the position of the pin means with respect to the anchoring member;

a work surface;

means for attaching said anchoring member to said work surface; and a second cam operably attached to said pin means and mounted for rotation about said axis.

2. The apparatus as in claim 1; including a track member attached to said work surface; and means for attaching said anchoring member to said track member.

3. The apparatus as in claim 1; wherein, the anchoring member includes an upper portion provided with a plurality of vertically arranged apertures which are dimensioned to receive said pin means.

4. The apparatus as in claim 3; wherein, said vertically arranged apertures are staggered relative to one another.

5. The apparatus as in claim 2; wherein, the anchoring member is further provided with a lower base portion which is dimensioned to be slidably received in said track member.

6. A workpiece clamping apparatus comprising:

a first cam having an arcuate exterior surface thereon;

an anchoring member;

pin means for rotationally mounting said cam about a horizontal axis relative to said anchoring member;

means for vertically adjusting the position of the pin means with respect to the anchoring member;

a work surface;

means for attaching said anchoring member to said work surface; and a track member attached to said work surface; and, means for attaching said anchoring member to said track member.

7. The apparatus as in claim 6; wherein, the anchoring member includes an upper portion provided with a plurality of vertically arranged apertures which are dimensioned to receive said pin means.

8. The apparatus as in claim 7; wherein, said vertically arranged apertures are staggered relative to one another.

9. The apparatus as in claim 6; wherein, the anchoring member is further provided with a lower base portion which is dimensioned to be slidably received in said track member.

* * * * *